United States Patent [19]

Sumiyoshi et al.

[11] Patent Number: 5,046,595
[45] Date of Patent: Sep. 10, 1991

[54] TORQUE TRANSMISSION COUPLING

[75] Inventors: Masaharu Sumiyoshi; Masaaki Noguchi, both of Aichi, Japan

[73] Assignee: Kabushiki Kaisha Toyota Chuo Kenkyusho, Aichi, Japan

[21] Appl. No.: 507,107

[22] Filed: Apr. 9, 1990

Related U.S. Application Data

[63] Continuation of Ser. No. 232,532, Aug. 16, 1988, abandoned, which is a continuation of Ser. No. 942,404, Dec. 16, 1986, abandoned.

[30] Foreign Application Priority Data

Dec. 26, 1985 [JP] Japan .................. 60-295802

[51] Int. Cl.$^5$ .................. F16D 25/02; F16D 43/28
[52] U.S. Cl. .................. 192/85 AA; 192/103 F
[58] Field of Search .......... 192/0.033, 85 AA, 103 F; 180/249, 233

[56] References Cited

U.S. PATENT DOCUMENTS

| | | | |
|---|---|---|---|
| 3,752,280 | 8/1973 | Cheek | 192/85 AA |
| 3,894,446 | 7/1975 | Snoy et al. | 74/711 |
| 3,987,689 | 10/1976 | Engle | 74/711 |
| 4,012,968 | 3/1977 | Kelbel | 74/711 |
| 4,041,804 | 8/1977 | Clark | 74/711 |
| 4,057,133 | 11/1977 | Tuzson | 192/103 F |
| 4,193,484 | 3/1980 | Collier | 192/60 |
| 4,445,400 | 5/1984 | Sullivan et al. | 74/711 |
| 4,456,110 | 6/1984 | Hanks et al. | 192/82 T |
| 4,719,998 | 1/1988 | Hiramatsu et al. | 192/0.033 |
| 4,938,306 | 7/1990 | Sumiyoshi et al. | 180/233 |

FOREIGN PATENT DOCUMENTS 688753 3/1953 United Kingdom .

Primary Examiner—Richard Lorence
Attorney, Agent, or Firm—Oblon, Spivak, McClelland, Maier & Neustadt

[57] ABSTRACT

A first rotary shaft is rotated by a driver and rotatively connected to a first rotary load. A second rotary shaft is rotatively connected to a second rotary load. A hydraulic pump includes a first rotor disposed on the first rotary shaft so as to be rotated together therewith. A second rotor is disposed on the second rotary shaft so as to be rotated together therewith. The second rotor acts so that, when a revolution speed difference has occurred between the first and second rotary shafts, the first and second rotors are each relatively slided on a sliding surface thereon by relative rotation corresponding to the difference, to heighten the pressure of liquid-tightly interposed oil and then supply the pressure-heightened oil. A multiple-disk clutch includes a group of engaging members disposed on the first rotary shaft so as to be rotated together therewith and so as to be movable in the axial direction thereof relative to the first rotary shaft, and another group of engaging members which are disposed on the second rotary shaft so as to be rotated together therewith. The latter engaging members are placed between the former engaging members so as to constitute a multiple-disk clutch, thus making is possible to engage both the groups of engaging members with each other to transmit torque.

1 Claim, 1 Drawing Sheet

TORQUE TRANSMISSION COUPLING

This application is a continuation of application Ser. No. 232,532, filed on Aug. 16, 1988, now abandoned, which is a continuation of application Ser. No. 942,404, filed on Dec. 16, 1986, now abandoned.

BACKGROUND OF THE INVENTION

The present invention relates to a torque transmission coupling through which torque can be transmitted from a first rotary shaft to a second rotary shaft when a revolution speed difference has occurred between both the rotary shafts. Oil pressure is produced by a hydraulic pump means on the basis of a relative rotation corresponding to the revolution speed difference, to immediately engage a multiple-disc clutch to enable the transmission of the torque from the first rotary shaft to the second rotary shaft.

BACKGROUND OF THE INVENTION

Conventionally, a viscous clutch as shown in FIG. 2 has been developed. In the viscous clutch, a plurality of disks PI having holes are juxtaposed at regular intervals on the inside surface of a casing C integrally provided on an input shaft I. A plurality of disks PO having notches are juxtaposed at regular intervals on an output shaft 0 disposed in the casing C coaxially therewith, and are placed between the disks PI. The input shaft I and the output shaft 0 are respectively in driving connection with the disks PI and PO. Silicone oil of high viscosity is sealed in the casing C and occupies about 90% of the interior volume of the casing. The disks PI and PO are spaced apart so that they are freely interleaved, and the silicone oil makes contact with the overlapping or working surfaces of the disks. That is, the spaces on opposite sides of each of the disks PI and PO are in fluid communication through the working surface of the disks. When a revolution speed difference has occurred between the input shaft I and the output shaft 0, the silicone oil in contact with the disks PI is rotated by the relative rotation of the disks PI to the other disks PO, because of the viscosity of the oil, so that the oil acts on the disks PO on the adjacent output shaft 0 by the viscosity of the oil. As a result, the disks PO and the output shaft 0 are rotated by the silicone oil. With increase of speed difference between the disks PI and PO, the characteristic of torque increase. Torque proportional to the revolution speed difference is thus transmitted from the input shaft I to the output shaft 0. The torque to be transmitted depends on the shearing stress caused in the silicone oil between the adjacent disks PI and PO. The shearing ratio in the silicone oil is proportional to the revolution speed difference.

The conventional viscous clutch has the following problems:

(1) Since the torque is transmitted from the disks PI to the other adjacent disks PO by the viscous shearing force of the silicone oil, the area of contact and the speed of shearing (slippage) between the silicone oil and the disks need to be large if high torque is to be transmitted. For that purpose, the diameter of the disks PI and PO and the number thereof need to be increased in other words, the capacity and size of the clutch need to be increased. In that case, the spatial efficiency will fall.

(2) When the speed of slip between the disks PI and PO in contact with the silicone oil rises, the oil is heated so that its viscosity changes and the torque-transmitting property of the clutch alters. In that case, the air contained in the casing C is thermally expanded so that the pressure in the casing rises. As a result, it is difficult to prevent the silicone oil from leaking through sealed portions which are for keeping the oil tightly sealed in.

(3) Once the dimensions and other factors of the viscous clutch are determined, the relation between the transmitted torque and the speed of slip is fixed so that the properties of the clutch can hardly be controlled from outside, depending on the revolution speed etc. of the clutch.

OBJECT OF THE INVENTION

It is an object of the present invention to provide a torque transmission coupling through which torque can be transmitted immediately when a revolution speed difference has occurred. Even if the revolution speed difference is small, the coupling can be engaged to transmit the torque. Furthermore, high torque can be transmitted through the coupling.

SUMMARY OF THE INVENTION

A torque transmission coupling provided according to the present invention comprises a first rotary shaft which is rotated by a driver and rotatively connected to a first rotary load means; a second rotary shaft rotatively connected to a second rotary load means; a hydraulic pump means which includes a first rotor having a prescribed form and disposed on the first rotary shaft so as to be rotated together therewith, and a second rotor disposed on the second rotary shaft so as to be rotated together therewith. The second rotor acts so that, when a revolution speed difference has occurred between the first and second rotary shafts, the first and second rotors are each relatively slided on a sliding surface on the other rotor by a relative rotation corresponding to the difference. This heightens the pressure of liquid-tightly interposed oil and then supply the pressure-heightened oil. The hydraulic pump means further includes means for maintaining a slight rotational speed difference between the first and second rotary shafts when the hydraulic pump means produces the pressure-heightened hydraulic oil in response to the relative rotation of the first and second rotors. A multiple-disk clutch means which includes a group of engaging members disposed on the first rotary shaft so as to be rotated together therewith and be movable in the axial direction thereof relative to the first rotary shaft, and another group of engaging members which are disposed on the second rotary shaft so as to be rotated together therewith and are placed between the former engaging members so as to constitute a multiple-disk clutch, thus making it possible to engage both the groups of engaging members with each other to transmit torque. A pushing means includes a hydraulic operating chamber to which the pressure of the oil from the hydraulic pump means is applied through an oil pressure passage means, and a pushing member defines the inner surface of the hydraulic operating chamber and is moved depending on the oil pressure so as to move at least one of the groups of engaging members in such a direction as to reduce the distance between the groups of engaging members to engage the members with each other. When a revolution speed difference has occurred between the first and second rotors of the hydraulic pump means, and oil pressure is produced by the relative rotation corresponding to the difference and is then applied to the hydraulic operating chamber through the oil pressure passage means to move the pushing member to engage both the groups of engaging members of the multiple-disk clutch means with each other to transmit the torque in response to the relative rotation from the first rotary shaft to the second rotary shaft.

The torque transmission coupling provided according to the present invention is used in a rotary drive system connected to a prime mover and including a first and a second rotary shaft which are driven by the single prime mover. Although the first and the second rotary shafts need to have almost the same revolution speed, the rotary shafts are allowed to have a slight revolution speed difference, depending on the loads etc. on the shafts.

The torque transmission coupling can fulfill a characteristic function when it is disadvantageous for the revolution speed difference between the first and the second rotary shafts to become excessive and the revolution speeds of both the shafts need to be quickly equalized to each other again.

In the torque transmission coupling, the revolution speed difference between the first and the second rotary shafts can be kept within a small range by controlling the oil pressure acting on the clutch. In other words, the coupling can serve as a torque transmission coupling of the revolution speed difference proportion type.

When the revolution speed difference has occurred between the first and the second rotors of the hydraulic pump means, the oil pressure is produced by the hydraulic pump means on the basis of the relative rotation corresponding to the revolution speed difference and is applied to the hydraulic operating chamber through the oil pressure passage means to move the pushing member to engage both the groups of engaged members of the multiple-disk clutch means with each other to immediately transmit the torque from the first rotary shaft to the second rotary shaft.

Since the oil pressure is produced by the hydraulic pump means on the basis of the relative rotation between the first and the second rotors as the revolution speed difference occurs therebetween, the groups of engaged members of the multiple-disk clutch means are directly brought into contact with each other and engaged with each other to transmit the torque. For that reason, the torque transmission coupling has an advantage that the torque can be transmitted in proportion to the revolution speed difference.

Since the oil pressure produced by the hydraulic pump means is applied to the hydraulic operating chamber through the oil pressure passage means to directly bring both the groups of engaged members into contact with each other and engage them with each other by moving the pushing member, the coupling can be made compact in comparison with the magnitude of the torque transmitted through the coupling.

GENERAL DISCUSSION OF THE INVENTION

Figure 1:
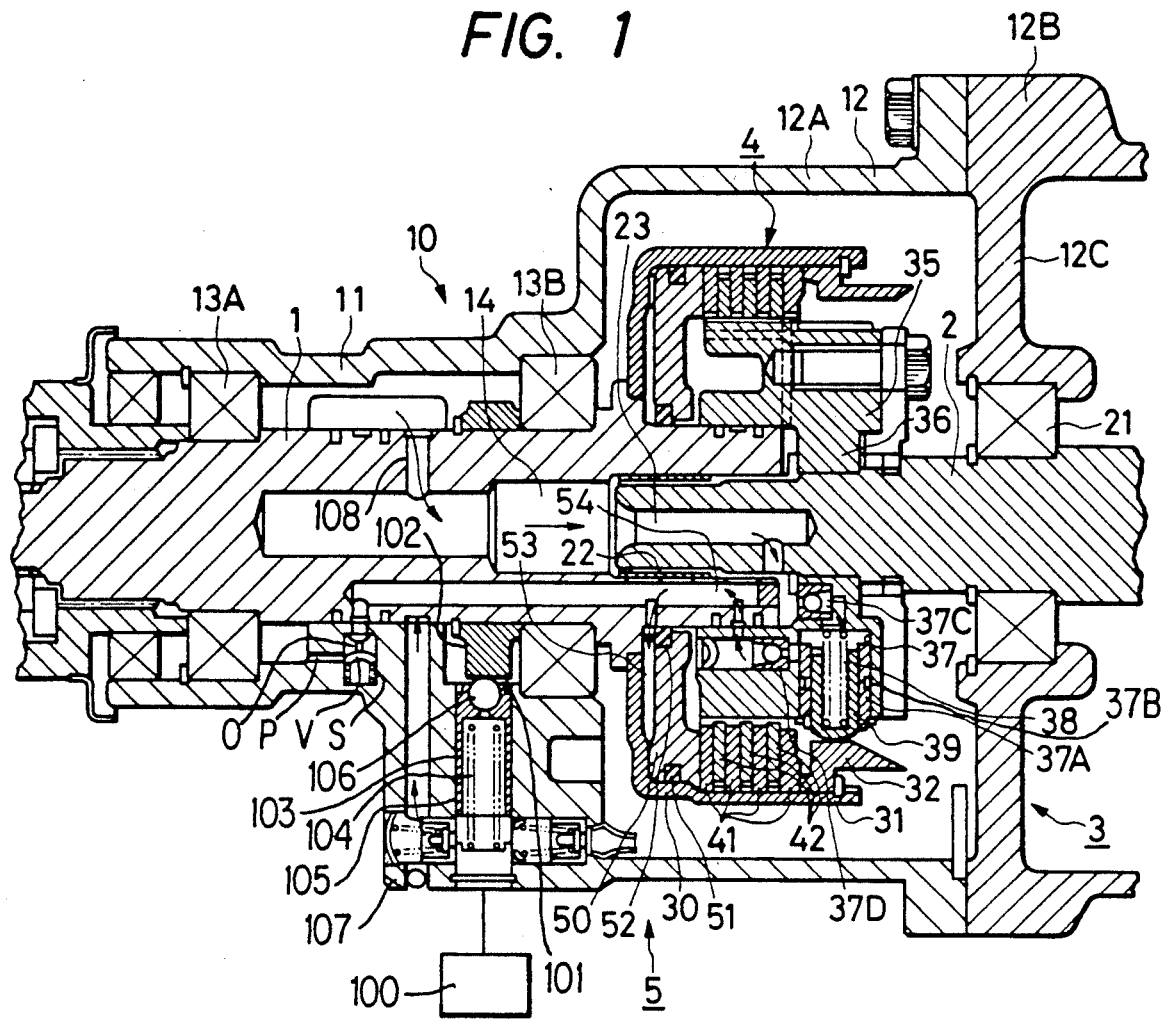
FIG. 1 shows a longitudinal sectional view of a torque transmission coupling which is a first embodiment of the present.
Figure 2:
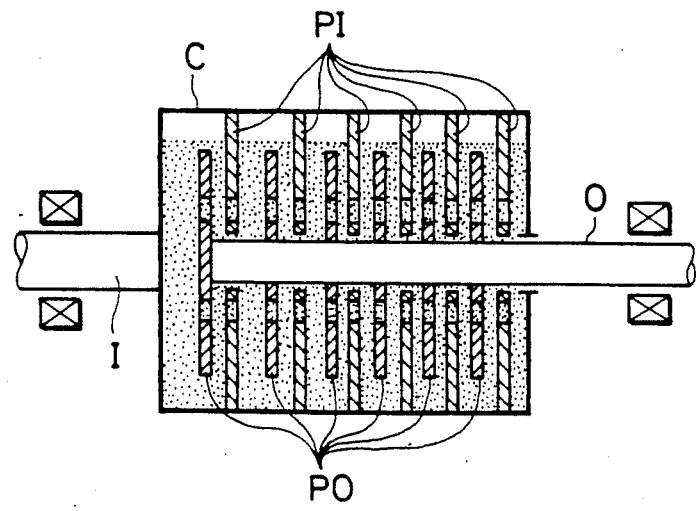
FIG. 2 shows a longitudinal sectional view of a conventional viscous clutch means.

The present invention can be embodied in such manners as described below.

In a torque transmission coupling which is an embodiment of the present invention in a first manner, a hydraulic pump means is provided between a first and a second rotary shafts to produce oil pressure by the revolution speed difference between the shafts, a multiple-disk clutch, which is engaged by a pushing member on the basis of the oil pressure to transmit torque, is disposed between the first and the second rotary shafts, and all these members and means are built in a transmission shaft system. The coupling is thus constructed as a compact built-in torque transmission coupling.

In a torque transmission coupling which is a embodiment of the present invention in a second manner, a hydraulic pump means built in a transmission shaft system, a pushing member and a multiple-disk clutch means are rotatably disposed in an oil-tightly fixed casing which holds oil. As a result, the coupling is made compact, and even high torque can be stably transmitted through the coupling.

In a torque transmission coupling which is a embodiment of the present invention in a third manner, a hydraulic pump means has a first rotor made of an annular body and provided with a cam surface in the inside circumferential surface thereof, a second rotor made of a cylindrical body inserted in the annular body, a plurality of cylinders radially provided, and spring means and plungers inserted in the cylinders. When a revolution speed difference has occurred between the first and the second rotors, the tips of the plungers are slid on the cam surface by the relative rotation between the first and the second rotors so that the plungers are moved back and forth in the cylinders. The volumes of the cylinders are thus changed to produce oil pressure Since the hydraulic pump means is constructed as a radial-plunger pump means, the axial length of the hydraulic pump means can be made small, a suction port and a drain port do not need to be changed for each other as to whether forward rotation or backward rotation is performed, and the pump means can be properly operated as long as there is a relative rotation. Since the coupling can be made compact, it is appropriate to be used in a limited space.

In a torque transmission coupling which is an embodiment of the present invention in a fourth manner, both the groups of engaged members of a wet multiple-disk clutch are provided in a casing, and oil is held in the casing. Since the temperature of the engaged members engaged with each other can be kept within a prescribed range by lubricating and cooling them with the oil held in the casing, the torque-transmitting property of the coupling is prevented from being changed as is done along with the rise in the temperature of silicone oil in a conventional viscous clutch. Therefore, the coupling has an advantage that the torque-transmitting property of the coupling is stable.

DETAILED DESCRIPTION OF THE PRESENTLY PREFERRED EMBODIMENT OF THE INVENTION

A torque transmission mechanism of revolution speed difference proportion type, which is an embodiment of the present invention, is now described with reference to FIG. 1. The torque transmission mechanism comprises a first rotary shaft 1 rotatably supported in a casing 10. A second rotary shaft 2 is inserted into the right-hand end (as seen in FIG. 1) of the first rotary shaft 1 coaxially therewith and supported rotatably relative to the first rotary shaft 1. A hydraulic pump means 3 includes a first rotor 30 having a cam ring 32 having a cam surface in the inside circumferential surface thereof and integrally secured at the right-hand end (as seen in FIG. 1) of a cup-shaped body 31 having a U-shaped longitudinal section and integrally provided on the first rotary shaft 1. A second rotor 35 having an annular clutch hub 36 is integrally provided on the second rotary shaft 2. The second rotor 35 has two radial cylinders 37 (only one of which s shown) in which springs 38 and plungers 39 are provided. A wet multiple-disk clutch means 4 is interposed between the first rotor 30 and the second rotor 35. A pushing means 5 made of a pushing member 50 is provided between the first rotary shaft 1 and the cup-shaped body 31 of the first rotor 30.

The first rotary shaft 1 is rotatably supported in the casing 10 by bearings 13A and 13B provided at a distance from each other at the right and left ends of a small-diameter portion 11 of the casing 10 having the small-diameter portion 11 and a large-diameter portion 12. The first rotary shaft 1 has an axial hole 14 extending in the axial direction of the shaft from its right-hand end toward its left-hand end. The second rotary shaft 2 is inserted into the axial hole 14 so that the second rotary shaft is supported.

The second rotary shaft 2 is rotatably supported both by a centering bush 22 provided in the axial hole 14 of the first rotary shaft 1, and by bearings 21 (only left-hand one is shown in FIG. 1) provided in parallel with each other at a distance therebetween in the centers of the vertical portions 12C of an end member 12B integrally secured at flanges to a main member 12A which constitutes the large-diameter portion 12 of the casing 10 together with the end member 12B. An axial hole 23 is provided in the left-hand portion of the second rotary shaft 2.

In the hydraulic pump means 3, and in particular in the cam ring 32 whose inside circumferential surface has the cam surface, the distance between the cam surface and the axis of the cam ring is increased and decreased at a prescribed ratio at angular intervals of 72° (which means that the cam surface has an alternative concave and convex structure). The cam ring 32 is integrally secured at the right-hand end of the cup-shaped body 31 having the U-shaped longitudinal section, and the cup-shaped body 31 is integrally secured at the right-hand end of the first rotary shaft 1.

The two radial cylinders 37 are provided at angular intervals of 180° in the annular clutch hub 36 constituting the second rotor 35 integrally secured to the second rotary shaft 2. The cylinders 37 are located in such positions that they extend toward the cam surface of the cam ring 32. The plungers 39, each of which is a bottomed hollow cylindrical member and has a U-shaped longitudinal section, and the helical springs 38 for urging the plungers 39 to bring their tips into contact with the cam surface of the cam ring 32, are inserted in the cylinders 37. An oil seal 37B and a cylindrical sleeve 37A are inserted in a liquid-tight manner in each radial cylinder 37.

Only when the plungers 39 are moved radially outwards to increase the volumes of the opening of the cylinders 37, the second rotor 35 is connected to an oil source (not shown in FIG. 1) through the axial holes 14 and 23 as oil passages of the first and the second rotary shafts 1 and 2 to supply oil to the second rotor 35. When the plungers 39 are moved radially inwards to decrease the volumes of, the cylinders 37, the second rotor 35 is disconnected from the oil source to tightly shut off the oil. These connection and disconnection are performed by first one-way valves 37C provided at the bottoms of the cylinders 37. The second rotor 35 is further provided with second one-way valves 37D near the bottoms of the cylinders 37 so as to allow connection only when the volumes of the cylinders are decreased. As a result, when the first and the second rotary shafts 1 and 2 have rotated relative to each other due to a revolution speed difference therebetween, the tips of the plungers 39 are slid on the cam surface of the cam ring 31 so that the plungers are moved back and forth in the cylinders 37, the oil is sucked in through the first one-way valves 37C, and the pressurized oil is drained out through the second one-way valves 37D.

The pushing means 5 is made of the pushing member 50 which is an annular rigid piston which is separate from any means for allowing a slight rotational speed difference between the first and second rotary shafts. The Piston is fitted with an inner circumferential seal 52 and an outer circumferential seal 51 and located near the bottom (left-hand end) of the cylindrical body of the first rotor 30. A hydraulic operating chamber 53 is defined between the inside bottom of the cup-shaped body 31 and the outside bottom (left-hand end) of the pushing member 50, which has an annular recess. The hydraulic operating chamber 53 is connected to the second one-way valves 37D of the hydraulic pump means 3 through an oil passage 54 is provided in the first rotary shaft 1, so that pressure oil is supplied into the hydraulic operating chamber 53 through the second one-way valves 37D and the oil passage 54 when oil pressure is produced by the hydraulic pump means 3.

By virtue of the selection of an open area of the reduced port O and other structures, in the event than an excessive hydraulic pressure is communicated to the multi-plate clutch in response to an extreme rotational difference between the first and second rotary shafts, the oil is released from the reduced port O through the passage P, whereby unison rotation of the multi-plate clutch is avoided, and a rotation at the slight rotational difference is permitted.

The reduced port O (which has a constant opening area) is provided to communicate with the left end of the left passage 54 of the oil supply pump 100. In the event that the hydraulic pressure discharged to the passage 54 exceeds a predetermined level, the oil is released through the passage P from the reduced port O, whereby the pressure of the pushing means 5 applied to the multi-plate clutch is prevented from increasing excessively, thereby preventing the unitary rotation of the first and second rotary shafts and thereby realizing or ensuring a slight constant rotational difference between the first and second rotary shafts.

Additionally, in FIG. 1 it is possible to dispose a valve member V having an arcuate longitudinal section close to the reduced port O and to contact it with the reduced port O by the spring S. When the hydraulic pump means 3 generates an excessively large hydraulic pressure, the valve member V is depressed downwardly in the figure against the spring force of the spring S through the reduced port O. Accordingly, the passage P and the reduced port O are in communication with each other to release the excessively large pressure.

The wet multiple-disk clutch means 4 comprises four annular engaged members 41 and three annular engaged members 42, which are alternately juxtaposed between the piston 50 of the pushing means 5 and the cam ring 32. Oil is held on the engaged members 41 and 42. The engaged members 41 are provided on the inside circumferential surface of the right half cylindrical portion of the cup-shaped body 31 of the first rotor 30 so that the engaged members 41 are rotated together with the cup-shaped body 31 but can be moved in the axial direction thereof relative to the cup-shaped body 31. The engaged members 42 are provided on the outside circumferential surface of the clutch hum 36 of the cylindrical body of the second rotor 35 so that the engaged members 42 are rotated together with the clutch hub 36 but can be moved in the axial direction thereof relative to the clutch hub.

In the embodiment of the preset invention is the first manner, an oil supply pump 100 is provided as the oil source to supply the oil to the hydraulic pump means 3. In the oil supply pump 100, a cam surface 101 which is caused by an eccentric ring 102 to ascend and descend repeatedly is fixedly provided on the peripheral surface of the first rotary shaft 1 near the right-hard bearing 13B for the shaft 1. A cylinder 103 is provided in the casing 10 and extends toward the cam surface 101. A helical spring 104 is disposed in the cylinder 103. A plunger 105 having a spherical tip portion 106 is inserted in the cylinder 103, and the plunger 105 is moved back and forth synchronously with the rotation of the first rotary shaft 1 to supply pressure oil to the axial holes 14 and 23 of the central portions of the first and the second rotary shafts 1 and 2 through an oil passage 107 in the casing 10 and a radial hole 108 in the first rotary shaft 1. Since the oil supply pump 100 is provided, a control function of altering the oil pressure of the hydraulic pump means 3 depending on the rotational frequency of the first rotary shaft 1 is added. As a result, the torque-transmitting property of the torque transmission coupling can be controlled from outside.

In the torque transmission mechanism of revolution speed difference proportion type, which is the embodiment of the present invention in the first manner, the tip of each plunger 39 is slid on the cam surface of the cam ring 32 of the hydraulic pump mans 3 when a revolution speed difference has occurred depending on the loads of load means connected to the first and the second rotary shafts 1 and 2. The plungers 39 in the cylinders 37 are moved back and forth depending on the sliding of the tips of the plungers 39 on the cam surface. The oil from the oil source is sucked into the cylinders 37 through the axial holes 14 and 23 of the first and the second rotary shafts 1 and 2 and the first one-way valves 37C synchronously with the reciprocation of the plungers 39 so that the oil has its pressure heightened and is then supplied into the hydraulic operating chamber 53 of the pushing means 5 through the second one-way valves 37D and the oil passage in the first rotary shaft 1 to move the pushing member 50 rightwards (as at FIG. 1) in the axial direction thereof. Since the pushing member 50 is thus moved rightwards, the distance between both the groups 41 and 42 of engaged members interposed between the pushing member 50 and the cam 32 is reduced to engage the members with each other to transmit torque from the first rotary shaft 1 to the second rotary shaft 2 through the group 41 of engaged members and then the other group 42 of engaged members so that the torque transmission mechanism acts to reduce the revolution speed difference between the first and the second rotary shafts 1 and 2. As a result, the revolution speed difference settles to such a value that the transmitted torque balances with the load of the load means on the second rotary shaft 2.

The oil pressure generated by the pump is fed from the vicinity of the sleeve 37, from which the upper end has been omitted, through the one-wave valve 37D and the oil passage 534 into the chamber 53 in the direction indicated by the arrows in FIG. 1.

Normal pressure is released between the various parts as explained above. When the pump produced an oil pressure in response to the normal rotation speed difference, the oil pressure is supplied to the chamber 53 to thereby press the pushing member, and the clutch means is engaged or operative to perform the torque transmission. Accordingly, the relative rotational speed difference is decreased. As a result, the oil pressure generated by the pump is decreased. Due to these two effects, the shafts are coupled to each other through the clutch, but the connection of the shafts is smoothly released due to the decrease of the oil pressure fed from the pump and the leakage of the oil from the chamber 53 and the like.

In the torque transmission coupling which is the embodiment of the present invention and has the construction and operation described above, the oil pressure for enabling the transmission of the torque by engaging the wet multiple-disk clutch means 4 is produced by the hydraulic pump means 3. For that reason, the coupling has an advantage that the torque can be effectually transmitted through the coupling even in such a range of small revolution speed difference that it may be difficult to transmit the torque through a conventional viscous clutch means.

In the embodiment of the present invention in the first manner, the pushing member 50 is moved by the oil pressure produced by the hydraulic pump means 3, to mechanically bring both the groups 41 and 42 of engaged members of the wet multiple-disk clutch means 4 into contact with each other and engage the members with each other to surely transmit the torque. For that reason, higher torque can be transmitted through the coupling than a conventional viscous clutch means utilizing the viscosity of silicone oil, and the coupling can be made compact in comparison with the magnitude of the transmitted torque.

Since the hydraulic pump means 3 of the coupling which is the embodiment of the present invention i the first manner is of the radial plunger type, the axial length of the coupling can be made small to make the coupling compact.

In the coupling which is the embodiment of the present invention in the first manner, the engaged members of the wet multiple-disk clutch mean 4 are lubricated and cooled by the held oil to keep the temperature of the engaged members within a prescribed range while they are engaged with each other. As a result, the torque-transmitting property of the coupling is prevented from being charged as done along with the rise in the temperature of silicone oil of a conventional viscous clutch means. The torque-transmitting property of the coupling is thus made stable.

Although the hydraulic pump means in the above-mentioned embodiment of the present invention is of the radial plunger type, the hydraulic pump means is not confined to this type, but may be of the swash-plate axial-plunger type, vane type, trochoid type, gear type, Roots type or the like if the hydraulic pump means can be provided between the first and the second rotary shafts to produce the oil pressure by the relative rotation between the shafts.

Although the multiple-disk clutch means in the above-mentioned embodiment of the present invention is of the wet type, the multiple-type, but may be of the ordinary dry type if cooling air can be positively delivered to restrict the rise in the temperature of the clutch means within a prescribed range, the clutch means can be used in a state of small temperature rise, or a good device for heat transfer can be provided and pressure oil can be shut off.

It will be understood from the description above that the torque transmission coupling provided according to the present invention can be well applied to the revolution speed transmission line of each of various machines of a platen, the drive system of a general or industrial vehicle, a rotor drive system or the like if they need and match the properties of the torque transmission coupling.

We claim:

1. A torque transmission coupling which comprises:
   (a) a first rotary shaft;
   (b) a second rotary shaft;
   (c) a hydraulic pump means which includes:
   (i) a first rotor having a prescribed form and disposed on said first rotary shaft so as to e rotated together therewith;
   (ii) a second rotor disposed on said second rotary shaft so as to be rotated together therewith and so as to act so that, when a revolution speed difference has occurred between first and second rotary shafts, said first and second rotary shafts are relatively slided on each sliding surface thereon by a relative rotation corresponding to said difference to heighten the pressure of liquid-tightly interposed oil and then to supply the pressure-heightened oil; and
   (iii) means for allowing a slight rotational speed difference between said first and second rotary shafts when said hydraulic pump means produces the pressure-heightened hydraulic oil in response to the relative rotation of said first and second rotors;
   (d) a multiple-disc clutch means which includes:
   (i) a group of engaging members disposed on said first rotary shaft so as to be rotated together therewith and so as to be movable in the axial direction thereof relative to said first rotary shaft and
   (ii) another group of engaging members which are disposed on said second rotary shaft so as to be rotated together therewith and which are placed between the former engaging members so as to constitute a multiple-disc clutch, thus making it possible to engage both said groups of engaging members with each together to transmit torque; and
   (e) a pushing means which includes:
   (i) a hydraulic operating chamber to which the pressure of the oil from said hydraulic pump means is applied through an oil pressure passage means and
   (ii) a pushing member which is separate from said means for allowing a slight rotational speed difference and which is defined on one part of the inner surface of said hydraulic operating chamber and which is moved depending on said oil pressure so as to move at least one of said groups of engaging members in such a direction as to reduce the distance between said groups of engaging members to engage said members with each other, wherein:
   (f) when said revolution speed difference has occurred between said first and second rotors of said hydraulic pump means, said oil pressure is produced by said relative rotating corresponding to said difference and is then applied to said hydraulic operating chamber through said oil pressure passage means to move said pushing member to engage both said groups of engaging members of said multiple-disc clutch means with each other to transmit said torque in response to said relative rotating from said first rotary shaft to said second rotary shaft.

* * * * *